US011010781B2

(12) United States Patent
Miller et al.

(10) Patent No.: US 11,010,781 B2
(45) Date of Patent: May 18, 2021

(54) AUTOMATIC REWARDS AND BENEFITS OPTIMIZATION

(71) Applicant: Capital One Services, LLC, McLean, VA (US)

(72) Inventors: Walter Avery Miller, Glen Allen, VA (US); Robert A. Martin, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/196,135

(22) Filed: Nov. 20, 2018

(65) Prior Publication Data

US 2020/0160368 A1     May 21, 2020

(51) Int. Cl.
    *G06Q 30/00*          (2012.01)
    *G06Q 30/02*          (2012.01)
    *G06Q 20/34*          (2012.01)

(52) U.S. Cl.
    CPC ....... *G06Q 30/0222* (2013.01); *G06Q 20/351* (2013.01); *G06Q 30/0215* (2013.01)

(58) Field of Classification Search
    CPC .................. G06Q 30/0207–30/0277
    USPC .............................. 705/14.1–14.73
    See application file for complete search history.

(56) References Cited

U.S. PATENT DOCUMENTS

| | | | | |
|---|---|---|---|---|
| 5,945,653 | A * | 8/1999 | Walker | G06Q 20/341 |
| | | | | 235/375 |
| 10,409,783 | B1 * | 9/2019 | Miller | G06Q 40/125 |
| 10,699,289 | B1 * | 6/2020 | Dalton | H04W 4/023 |
| 2010/0250379 | A1 * | 9/2010 | Giordano | G06Q 20/00 |
| | | | | 705/20 |
| 2011/0191160 | A1 * | 8/2011 | Blackhurst | G06Q 20/20 |
| | | | | 705/14.38 |
| 2011/0270971 | A1 * | 11/2011 | Abraham | G06Q 10/0637 |
| | | | | 709/224 |
| 2014/0070001 | A1 * | 3/2014 | Sanchez | G06Q 40/025 |
| | | | | 235/380 |
| 2014/0172559 | A1 * | 6/2014 | Calman | G06Q 30/0261 |
| | | | | 705/14.53 |
| 2017/0053347 | A1 * | 2/2017 | Lipshitz | G06Q 30/0601 |
| 2017/0061461 | A1 * | 3/2017 | Jajara | G06Q 20/405 |
| 2017/0161825 | A1 * | 6/2017 | Nair | G06Q 30/0255 |
| 2018/0096323 | A1 * | 4/2018 | Baber | G06Q 20/385 |
| 2019/0130432 | A1 * | 5/2019 | Unnerstall | G06Q 20/387 |
| 2019/0272537 | A1 * | 9/2019 | Miller | G06F 16/1815 |
| 2019/0311360 | A1 * | 10/2019 | Miller | G06N 20/00 |
| 2020/0074433 | A1 * | 3/2020 | Chopra | G06Q 20/401 |

\* cited by examiner

*Primary Examiner* — Luis A Brown
(74) *Attorney, Agent, or Firm* — DLA Piper LLP US

(57) ABSTRACT

A processor may detect a user interaction with a user interface provided through a network by a server. The processor may analyze the user interaction to identify at least one offer associated with at least one item available for purchase through the user interface. The offer may be associated with a first payment type. The processor may process a user transaction to purchase the at least one item. The processing may include automatically applying the first payment type to the transaction.

11 Claims, 8 Drawing Sheets

AUTOMATIC REWARDS AND BENEFITS OPTIMIZATION

BACKGROUND

Internet-based commerce systems and methods are widely available. In many ecommerce systems, a user may purchase goods or services by sending a transaction request to a transaction server. For example, a user of an electronic device may select a payment method (e.g., a credit card or debit card), enter payment information (e.g., a card number and/or other required information), and send the information to a server for processing. Generally, users may have multiple payment options at their disposal, and different payment options may provide different benefits to the user. For example, some payment types and/or ecommerce merchants may offer rewards (e.g., miles, points, cash back, etc.) or other incentives and/or financing options.

SUMMARY OF THE DISCLOSURE

Some embodiments disclosed herein may include a method of applying an offer to a transaction. The method may include detecting, by a processor, a user interaction with a user interface provided through a network by a server. The method may include analyzing, by the processor, the user interaction to identify at least one offer associated with at least one item available for purchase through the user interface. The offer may be associated with a first payment type. The method may include generating, by the processor, a virtual credit card number as the first payment type. The method may include processing, by the processor, a user transaction to purchase the at least one item using the virtual credit card number.

In some embodiments, the user interaction may include visiting an online store. The at least one offer may be offered by the online store.

In some embodiments, the user interaction may include selecting the at least one item. The at least one offer may apply to the selected at least one item.

In some embodiments, the method may include sending, by the processor, a notification describing the at least one offer to a user device associated with the user interaction. The method may include receiving, by the processor, a user request to apply the at least one offer. The automatically applying may be performed in response to the user request.

In some embodiments, the method may include collecting, by the processor, a plurality of offers from a plurality of sources. The analyzing may include selecting the at least one offer from the collected plurality of offers.

In some embodiments, the processing may include applying a charge to a user account for the at least one item purchased using the virtual credit card number.

Some embodiments disclosed herein may include a method of applying an offer to a transaction. The method may include detecting, by a processor, a user interaction with a user interface provided through a network by a server. The method may include analyzing, by the processor, the user interaction to identify at least one offer associated with at least one item available for purchase through the user interface. The offer may be associated with a first payment type. The method may include processing, by the processor, a user transaction to purchase the at least one item. The processing may include automatically applying the first payment type to the transaction.

In some embodiments, the user interaction may include visiting an online store. The at least one offer may be offered by the online store.

In some embodiments, the user interaction may include selecting the at least one item. The at least one offer may apply to the selected at least one item.

In some embodiments, the method may include sending, by the processor, a notification describing the at least one offer to a user device associated with the user interaction. The method may include receiving, by the processor, a user request to apply the at least one offer. The automatically applying may be performed in response to the user request.

In some embodiments, the method may include collecting, by the processor, a plurality of offers from a plurality of sources. The analyzing may include selecting the at least one offer from the collected plurality of offers.

In some embodiments, the automatically applying may include selecting the first payment type from among a plurality of payment types associated with a user requesting the user transaction.

In some embodiments, the automatically applying may include generating a virtual credit card number as the first payment type.

Some embodiments disclosed herein may include a server device. The server device may include a transceiver, a processor in communication with the at least one transceiver, and a non-transitory memory in communication with the processor. The memory may be configured to store a plurality of offers and to store instructions that, when executed by the processor, cause the processor to perform processing. The processing may include detecting a user interaction with a user interface provided through a network by a server. The processing may include analyzing the user interaction to identify, within the plurality of offers, at least one offer associated with at least one item available for purchase through the user interface. The offer may be associated with a first payment type. The processing may include causing a user transaction to purchase the at least one item to be processed. The causing may include automatically applying the first payment type to the transaction.

In some embodiments, the processing may further include sending, by the transceiver, a notification describing the at least one offer to a user device associated with the user interaction and receiving, by the transceiver, a user request to apply the at least one offer. The automatically applying may be performed in response to the user request.

In some embodiments, the processing may further include collecting the plurality of offers from a plurality of sources and storing the collected plurality of offers in the memory. In some embodiments, the collecting may include gathering data from at least one network source by the transceiver.

In some embodiments, the automatically applying may include selecting the first payment type from among a plurality of payment types associated with a user requesting the user transaction.

In some embodiments, the automatically applying may include generating a virtual credit card number as the first payment type.

In some embodiments, the detecting may include analyzing network traffic received by the transceiver.

DETAILED DESCRIPTION OF SEVERAL EMBODIMENTS

Systems and methods described herein may improve transaction authorization and/or processing systems through identification and implementation of optimized payment options. For example, an optimization service may provide a customer with optimized applications of card benefits and/or payment options (e.g., including rewards points and/or financing) based on combining browser extensions and cookie tracking with data collected on various card and bank accounts. In some embodiments, the optimization service may automatically select a best payment option from among available options for the user (e.g., user's accounts and/or vendor-specific options). In some embodiments, the optimization service may automatically apply the best payment option to an ecommerce transaction, which may involve unconventional processing such as generation of virtual payment products for use in the specific transaction and later conversion to a real payment product, in a manner that is seamless and that does not disrupt processing by ecommerce system(s) involved in the transaction.

Figure 1:
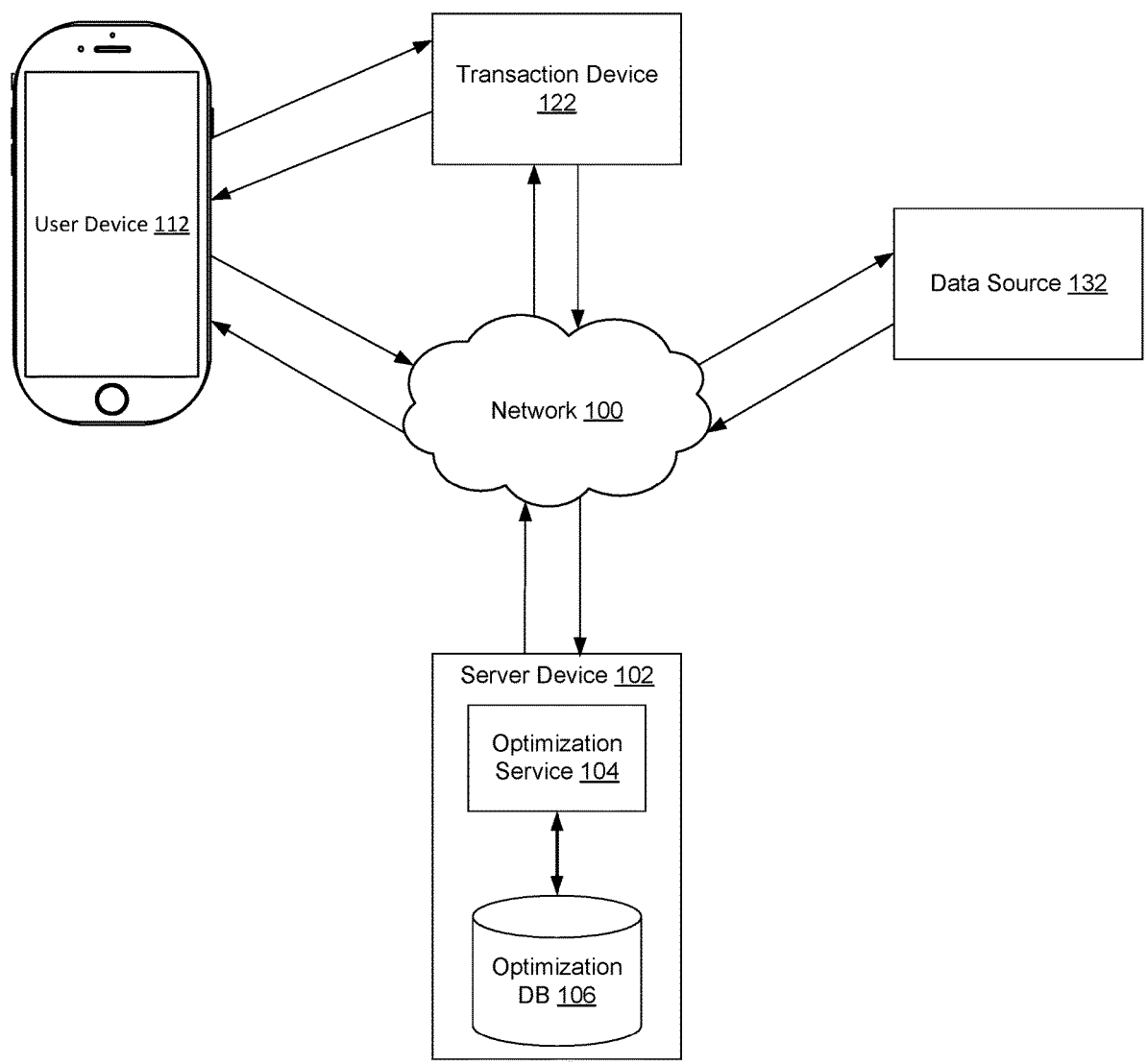
FIG. 1 shows a network according to an embodiment of the present disclosure.

FIG. 1 shows a network 100 according to an embodiment of the present disclosure. A user device 112 may be used for performing or attempting to perform a transaction (e.g., purchasing something from a vendor in exchange for funds). User device 112 may be a smartphone, tablet, computer, or other device configured to request transactions. User device 112 may communicate with transaction device 122 to perform the transaction. Transaction device 122 may be a server hosting an ecommerce website or online store, a point of sale device, or other device configured to perform a transaction through communication with user device 112. User device 112 and transaction device 122 may communicate by network 100 (e.g., the Internet or another public and/or private network) and/or through a direct connection (e.g., Bluetooth or other near-field communication) in some embodiments.

Server device 102 may be a server configured to analyze interactions between user device 112 and transaction device 122 in order to detect alternative payment options for transactions. Server device 102 may also be configured to suggest and/or implement the alternative payment options. For example, server device 102 may include optimization service 104, which may be configured to analyze, suggest, and/or process transactions as described in detail below, and optimization database 106, which may be configured to store transaction and/or payment option data. In some embodiments, optimization service 104 may draw on available offer data provided by transaction device 122, external data source(s) 132, and/or optimization database 106 in order to find advantageous payment options. In some embodiments, optimization service 104 may create virtual payment products (e.g., virtual credit card numbers) in order to provide payment options that are different from those offered by a credit card provided by user device 112 for the transaction, and optimization service 104 may then bill the credit card provided by user device 112 based on the transaction carried out by the virtual credit card. Server device 102 is depicted as a single server including a single optimization service 104 and optimization database 106 for ease of illustration, but those of ordinary skill in the art will appreciate that server device 102 may be embodied in different forms for different implementations. For example, server device 102 may include a plurality of servers.

Figure 2:
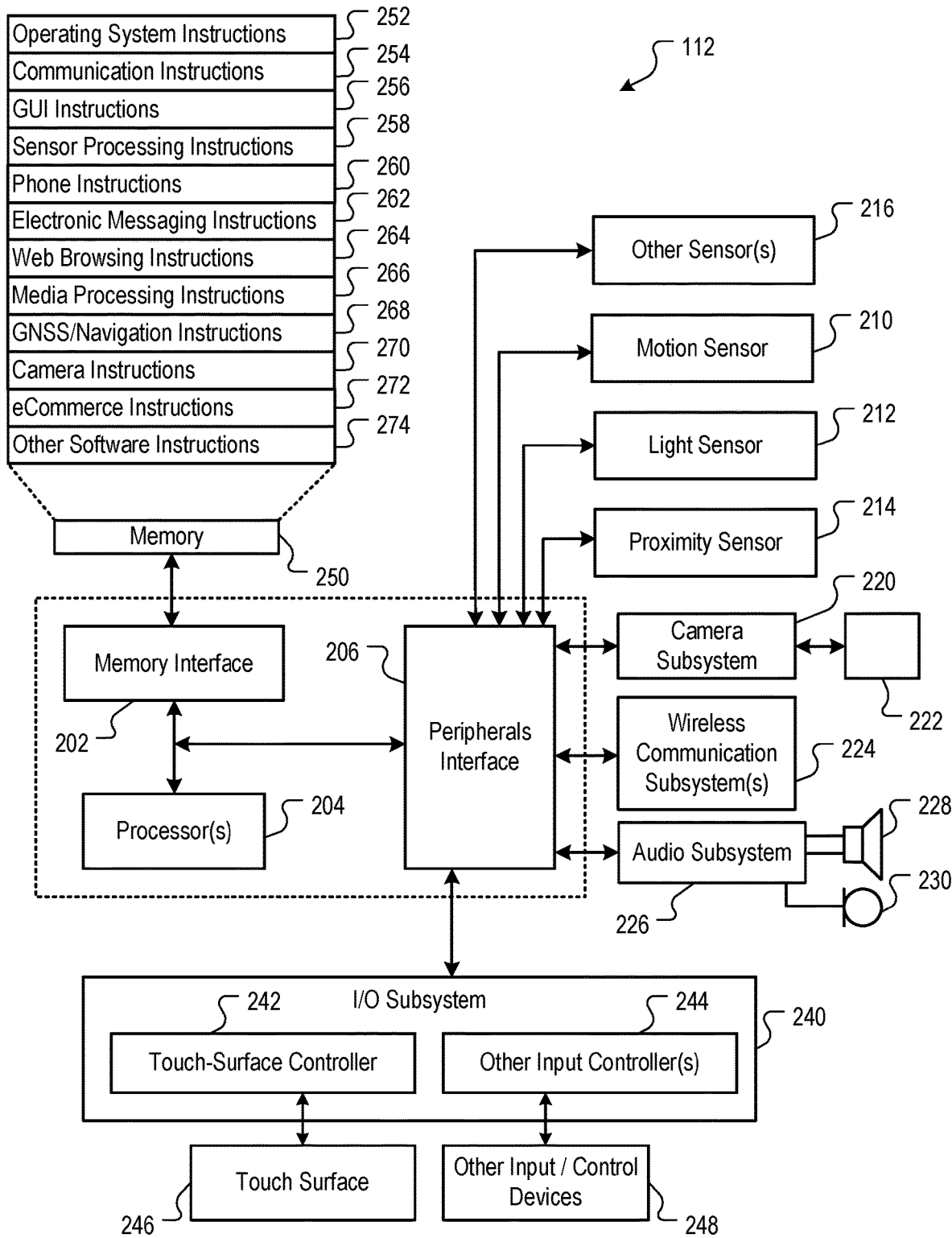
FIG. 2 shows a computer device according to an embodiment of the present disclosure.

FIG. 2 shows a computer device (e.g., user device 112). For example, user device 112 may interact with server device 102 and/or transaction device 122 to process transaction requests as described herein. The user device 112 may include a memory interface 202, one or more data processors, image processors, central processing units 204, and a peripherals interface 206. The memory interface 202, the one or more processors 204, and/or the peripherals interface 206 may be separate components or may be integrated in one or more integrated circuits. The various components in the user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network (s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 112 may present recorded audio and/or video files, such as MP3, AAC, and MPEG files. In some implementations, the user device 112 may include the functionality of an MP3 player, such as an iPod™. The user device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store ecommerce instructions 272 to facilitate other processes and functions, such as forming transaction requests and/or communicating with server device 102 and/or transaction device 122 to process the transaction requests as described herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112 may be implemented in hardware and/or in software, including in one or more signal processing and/or application specific integrated circuits.

Figure 3:
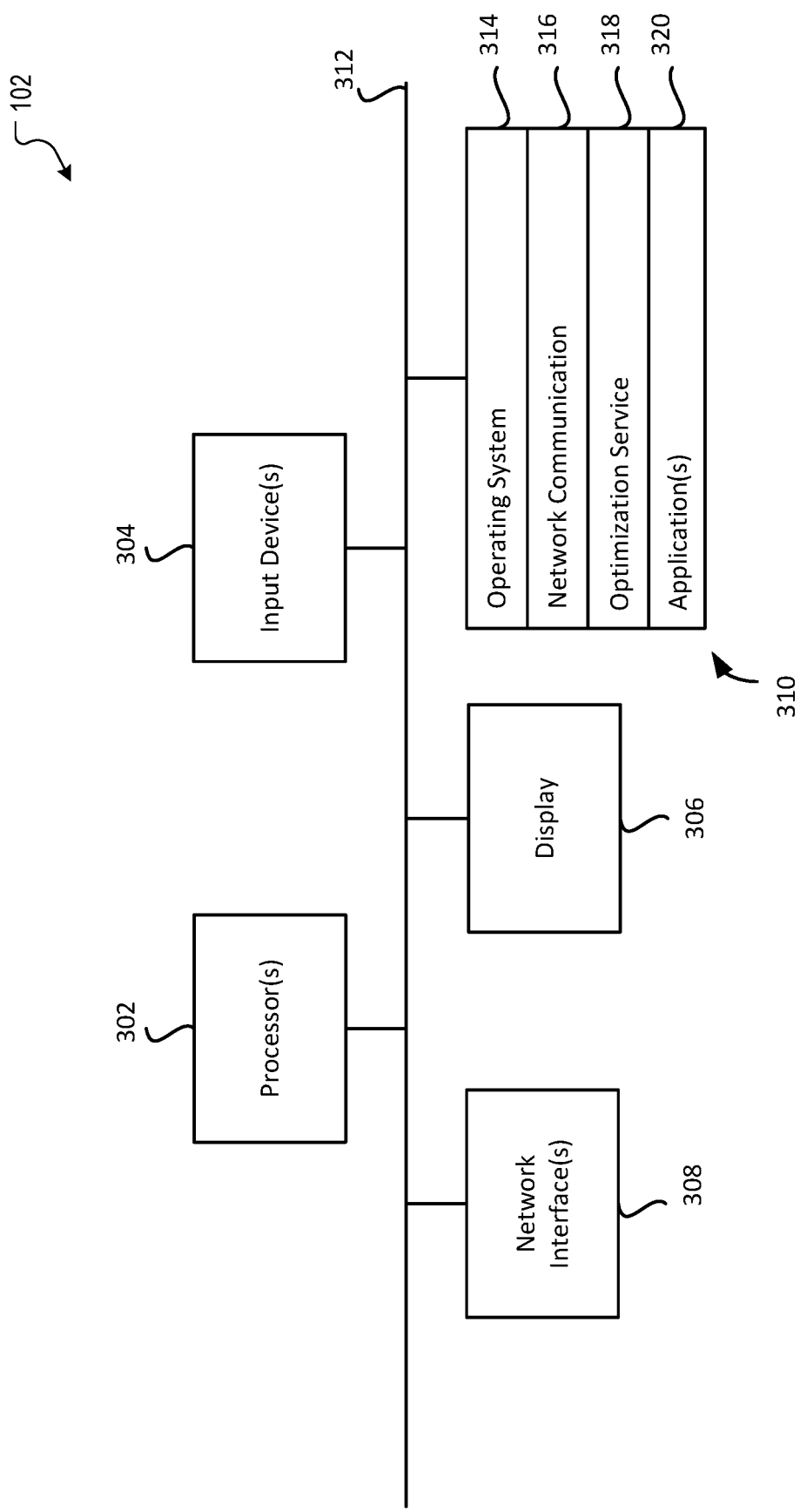
FIG. 3 shows a server device according to an embodiment of the present disclosure.

FIG. 3 shows a server device 102 according to an embodiment of the present disclosure. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Optimization service instructions 318 can include instructions that evaluate transaction requests and/or provide alternative transaction options as described herein. Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
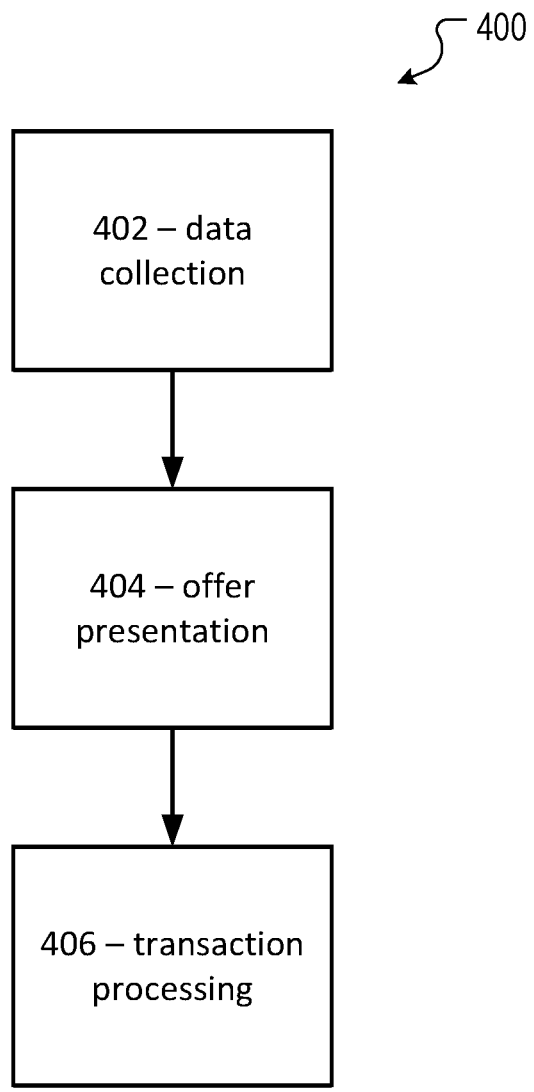
FIG. 4 shows a reward/benefit optimization process according to an embodiment of the present disclosure.

FIG. 4 shows a reward/benefit optimization process 400 according to an embodiment of the present disclosure. Server device 102 may perform process 400 through internal processing and/or interaction with other devices on network 100, such as user device 112, transaction device 122, and/or data source 132. Process 400 may identify, implement, and process optimized payment options for ecommerce transactions.

At 402, server device 102 may collect data that may be used for determining available reward and/or benefit options. For example, optimization service 104 may gather data according to the process of FIG. 5.

Figure 5:
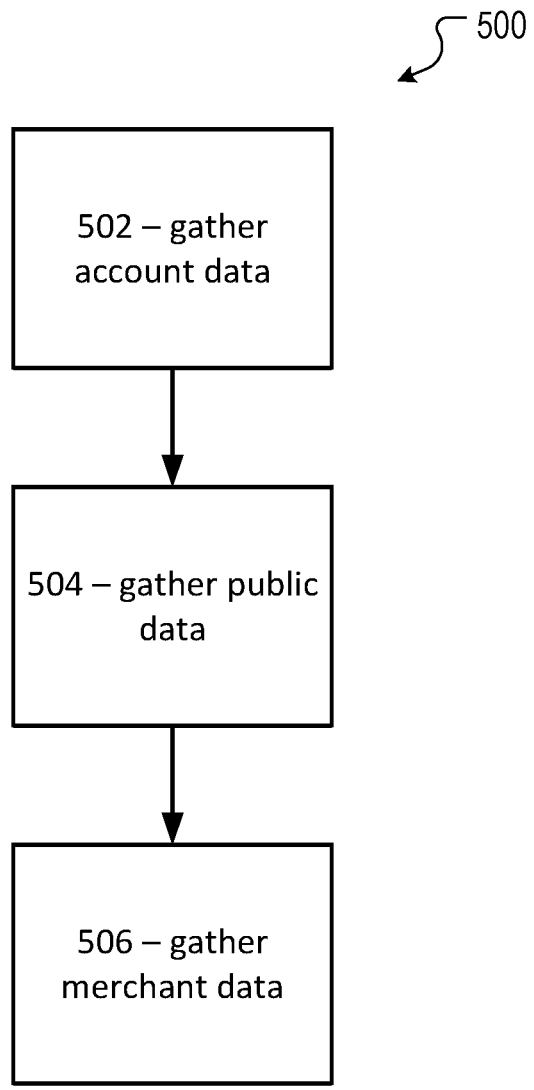
FIG. 5 shows a reward/benefit determination process according to an embodiment of the present disclosure.

FIG. 5 shows a reward/benefit determination process 500 according to an embodiment of the present disclosure. Server device 102 may perform process 500 at step 402 of process 400 to determine available offers for a customer attempting a transaction. In some embodiments, process 500 may be triggered when a customer enters into a transaction process. For example, optimization service 104 may detect an interaction between user device 112 and transaction device 122 through network 100 (e.g., by monitoring network 100 traffic and/or through communication from transaction device 122 or user device 112 to optimization service 104). In some embodiments, user device 112 may have an application, web browser extension, cookie, or other code installed thereon that may communicate with optimization service 104 to indicate that user device 112 is communicating with transaction device 122. Transaction device 122 may serve an ecommerce website with one or more products available for sale, for example. The interaction may be related to a specific intended transaction (e.g., browsing a particular product's page and/or adding the product to a cart) or may be more general (e.g., merely visiting the ecommerce website).

At 502, server device 102 may gather data about the customer's accounts to determine whether there are any offers associated with the accounts. For example, in some embodiments, the application, web browser extension, cookie, or other code installed on user device 112 may be provided by a bank or other financial institution or may be otherwise associated with the bank or financial institution. In some cases, a user may be logged into the application or extension or may otherwise associate their bank account with the code on user device 112. Accordingly, when user device 112 communicates with optimization service 104, optimization service 104 may be able to determine an identity of a user device 112 user or an account associated with user device 112. In another example, optimization service 104 may store data associating a particular user device 112 with a particular account holder. In any case, user device 112 may be able to identify an account of the user and determine information about payment options associated with the account. For example, the account may have fees, temporary rewards (e.g., cash back at certain merchants), persistent rewards (e.g., miles or points earned per dollar spent), accruals against maximum points available to be earned, etc. In some cases, user device 112 may be associated with multiple accounts, and optimization service 104 may be able to identify information about each account (e.g., multiple credit cards, where different credit cards may offer different point options depending on type of transaction).

At 504, server device 102 may gather publicly available data to determine whether there are any publicly available offers relevant to the situation. For example, user device 112 may communicate with transaction device 122 to view a website associated with a specific product or merchant, and this data may be received by optimization service 104 (e.g., through reporting by the cookie or browser extension). Optimization service 104 may crawl and/or scrape network 100 data, including web pages hosted by transaction device 122 and/or data source(s) 132 for example, in order to locate any offers related to the product and/or merchant. Optimization service 104 may use any web crawling and/or scraping technique to locate such data, for example based on key words identifying the product and/or merchant. The crawling and/or scraping may be performed in real time in response to the interaction noted above or may have been performed previously with results stored in optimization database 106.

At 506, server device 102 may gather merchant data related to transaction device 122 to determine whether there are any available offers specific to the merchant. In some cases, the merchant may self-report data about offers to optimization service 104 (e.g., through an API accessed by transaction device 122), and this data may be stored by optimization service 104 in optimization database 106. In some cases, optimization service 104 may scrape data from the web page(s) hosted by transaction device 122 that are being requested by user device 112 (e.g., in real time), and this data may be stored by optimization service 104 in optimization database 106.

Returning to FIG. 4, at 404, server device 102 may present one or more available offers determined at 402 to a customer attempting a transaction. For example, optimization service 104 may present offers according to the process of FIG. 6.

Figure 6:
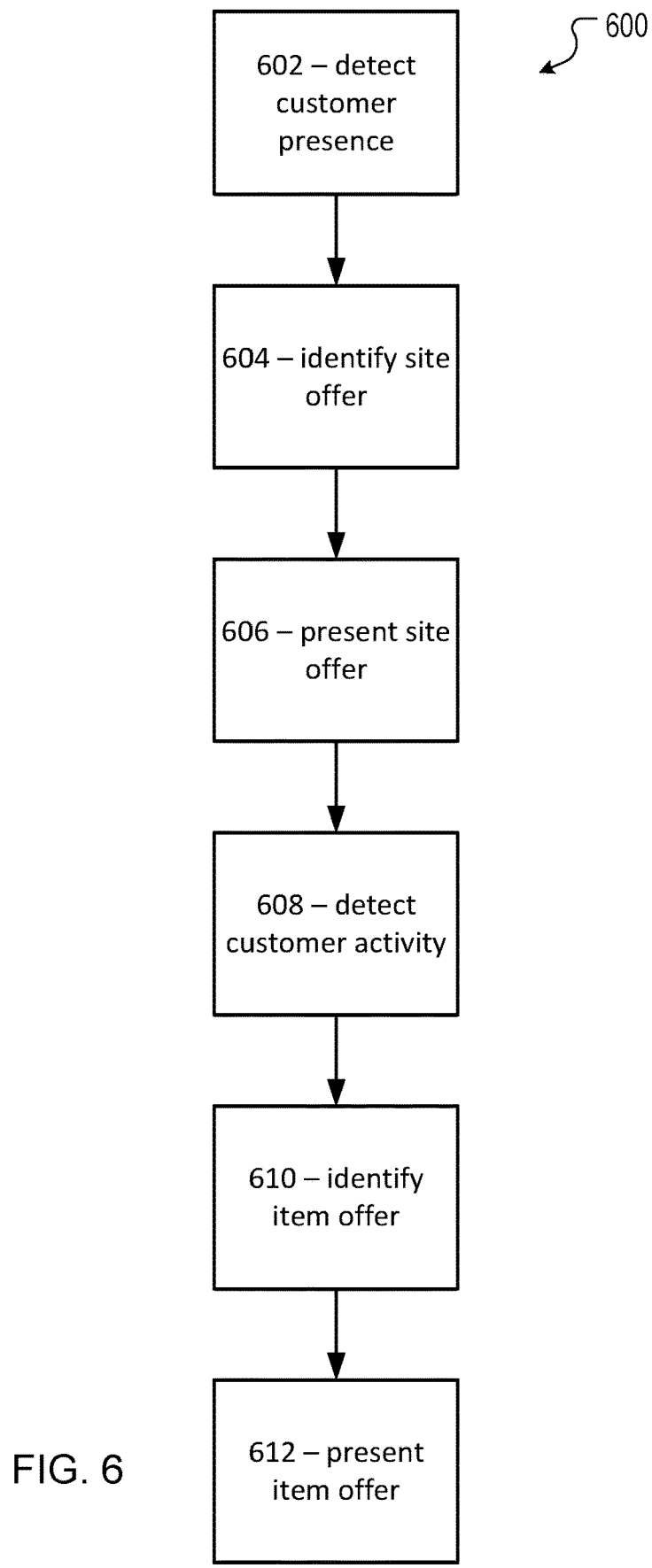
FIG. 6 shows a reward/benefit offer process according to an embodiment of the present disclosure.

FIG. 6 shows a reward/benefit offer process 600 according to an embodiment of the present disclosure. Server device 102 may perform process 600 at step 404 of process 400 at one or more points during a customer's interaction with an ecommerce website to present offers that may be relevant to the browsing context.

At 602, server device 102 may detect a customer interacting with a particular web page. For example, as noted above, user device 112 may report an interaction with transaction device 122 to optimization service 104 (e.g., through a cookie, application, or browser extension). Optimization service 104 may identify transaction device 122 and/or a specific webpage being served to user device 112 by transaction device 122 from the data reported by user device 112.

At 604, server device 102 may identify an offer associated with and/or applicable to the specific webpage. For example, a merchant may have a site-wide sale or financing offer available. Optimization service 104 may have data describing the sale or financing offer that may have been gathered through process 500 described above. Likewise, optimization service 104 may have data describing a generally-applicable offer (e.g., provided by a user's credit card) that may have been gathered through process 500 described above. When the user interacts with the site (e.g., as determined at 602), optimization service 104 may identify the sale or financing offer (and/or any other offer) for the site.

At 606, server device 102 may present any offer(s) identified at 604 to the user. For example, optimization service 104 may send information describing the offer to user device 112, which may provide the user with the option to accept the offer (e.g., as described below with respect to FIG. 7).

At 608, server device 102 may detect further customer interactions with the web page. For example, as noted above, user device 112 may report an interaction with transaction device 122 to optimization service 104 (e.g., through a cookie, application, or browser extension). In some cases, the user may browse to a particular item's page and/or may add the item to a shopping cart or otherwise initiate a transaction to purchase the item. Optimization service 104 may identify transaction device 122 and/or a specific item being featured in the communication with user device 112 by transaction device 122 from the data reported by user device 112.

At 610, server device 102 may identify an offer associated with and/or applicable to the specific item. For example, a merchant or the item's manufacturer may have a specific offer applying to the item available. Optimization service 104 may have data describing the offer that may have been gathered through process 500 described above. Likewise, optimization service 104 may have data describing an offer for the item from a user's account (e.g., extra points on a travel-related purchase provided by a user's travel credit card, for example as defined by merchant category codes and transaction (e.g., NAICS) codes known to optimization service 104) that may have been gathered through process 500 described above. When the user interacts with the site (e.g., as determined at 602), optimization service 104 may identify the offer(s) that may be particularly applicable to the item.

At 612, server device 102 may present any offer(s) identified at 610 to the user. For example, optimization service 104 may send information describing the offer to user device 112, which may provide the user with the option to accept the offer (e.g., as described below with respect to FIG. 7).

Returning to FIG. 4, at 406, server device 102 may receive a customer selection of an offer presented at 404 and process the transaction according to the customer selection. For example, optimization service 104 may receive a response from user device 112 including the selection and process the transaction as directed by the selection according to the process of FIG. 7.

Figure 7:
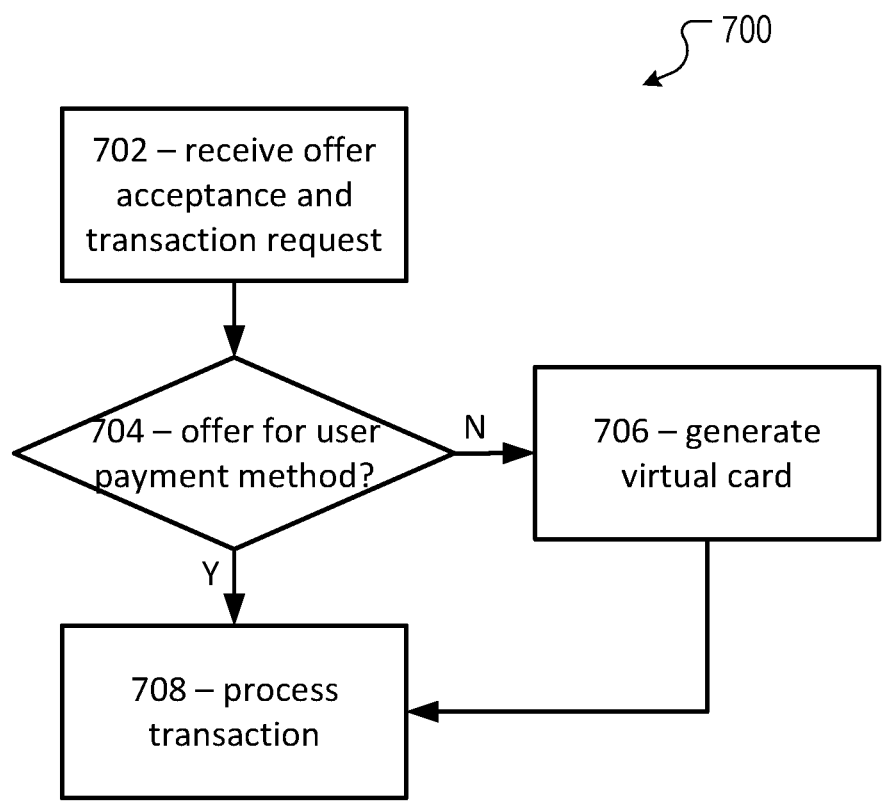
FIG. 7 shows a reward/benefit redemption process according to an embodiment of the present disclosure.

FIG. 7 shows a reward/benefit redemption process 700 according to an embodiment of the present disclosure. Server device 102 may perform process 700 at step 406 of process 400 in response to receiving acceptance of an offer presented at 404 from user device 112.

At 702, server device 102 may receive information from user device 112 and/or transaction device 122 indicating that an offer presented at 404 has been selected and/or including other transaction details. For example, in addition to identifying the selection, the information may identify a payor (e.g., a user of user device 112), a payee (e.g., a merchant associated with transaction device 122), an amount of the transaction, an account to be debited or charged for the transaction, and/or other transaction-related information.

At 704, server device 102 may analyze the information. For example, optimization service 104 may determine the terms of the accepted offer and whether the offer is associated with a payment account of the user. For example, the offer may be associated with a payment account of the user when it is provided as a perk or reward for the user's credit card or other account (e.g., the user may have opted to pay using a credit card they possess that gives strong cash back rewards for the transaction). In other cases, optimization service 104 may determine that the offer is not provided by a payment account of the user, and may be, for example, an offer provided by the merchant or the manufacturer of the item as described above. If the offer is associated with a payment account of the user, process 700 may proceed to 708. If the offer is not associated with a payment account of the user, process 700 may proceed to 706.

At 706, server device 102 may generate a virtual credit card number for processing the transaction. For example, optimization service 104 may generate instructions for executing a payment on the terms provided by the selected offer. The terms may include a reduced price for the item, a financed payment plan for the item, a reward for the purchase (e.g., airline miles, credit card points, cash back, etc.), or a combination thereof. Optimization service 104 may generate a virtual credit card number that is eligible for the terms. In some embodiments, the virtual credit card number may be valid for the specific transaction being performed only and/or may expire after the single use. The virtual credit card number may be used for processing the transaction, and thereafter, a real account of the user may be charged for the amount paid for using the virtual credit card.

Figure 8:
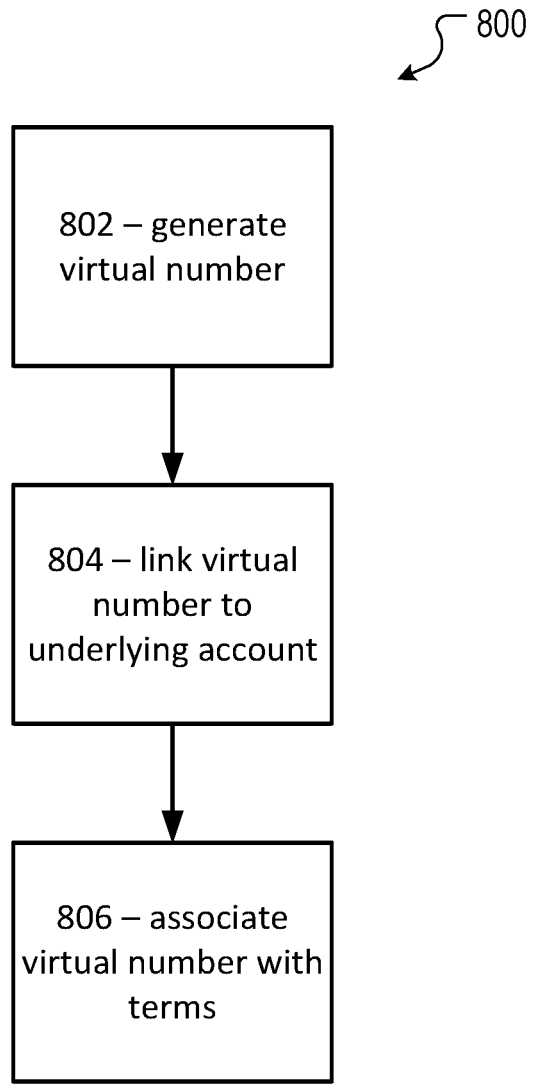
FIG. 8 shows a virtual card process according to an embodiment of the invention.

FIG. 8 shows a virtual card process 800 according to an embodiment of the invention. For example, server device 102 may use process 800 to generate the virtual credit card number at 706 in some embodiments.

At 802, server device 102 may generate the virtual credit card number itself. For example, optimization service 104 may generate a 16 digit credit card number and/or other information needed for the transaction (e.g., a card expiration date, a card security code, a card account holder name, etc.).

At 804, server device 102 may link the virtual credit card number to the underlying account (e.g., the account to be debited or charged for the transaction as determined at 702). For example, optimization service 104 may link the virtual credit card number to the underlying account through a token vault, where an underlying account identifier may be associated with the virtual credit card number.

At 806, server device 102 may associate the virtual credit card number with one or more transaction terms. For example, optimization service 104 may associate the virtual credit card number with a specific set of terms by applying transactions on the virtual credit card number to a specific bin of parameters in the account system of record, which may be cloud based, mainframe based, or distributed ledger based. For example, terms may include a certain annual percentage rate, a fixed set of payment terms, or a combination of those features along with others. At this point, the virtual credit card number may be available for processing.

As described below, the virtual credit card number may be processed as a normal card transaction, pursuant to the rules of the card networks.

Returning to FIG. 7, at 708, server device 102 may process the transaction. For example, if the offer is determined to be associated with a payment account of the user at 704, optimization service 104 may process the transaction using the payment account (e.g., the actual credit card number of the user's credit card account) in a standard fashion. Otherwise, if a virtual credit card number was generated at 706, optimization service 104 may process the transaction using the virtual credit card number. In some cases, server device 102 may include transaction processing functionality and may process the transaction. In other cases, optimization service 104 may provide payment details (e.g., real or virtual credit card number, parties involved, amount involved, etc.) to a payment transaction service separate from server device 102 through network 100 or a secure channel.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of applying an offer to a transaction comprising:
   detecting, by a processor, a user interaction with a user interface provided through a network by a server;
   analyzing, by the processor, the user interaction to identify at least one offer associated with an item to be purchased from a vendor through the user interface, the at least one offer provided by the vendor and associated with a user-selectable first payment type provided by the vendor, the identifying including determining that a benefit conveys to the user because of the application of the first payment type to a user transaction to purchase the item from the vendor according to terms of the offer provided by the vendor;
   presenting, by the processor, the at least one offer and an indication of the benefit to the user;
   receiving a selection of the user-selectable first payment type and an acceptance of the at least one offer through the user interface;

generating, by the processor, a virtual credit card number having applied thereto one or more payment terms specified by the first payment type;

linking, by the processor, the virtual credit card number to a financial account of the user; and processing, by the processor, the user transaction to purchase the item from the vendor using the virtual credit card number according to the one or more payment terms, the processing including charging or debiting the financial account of the user according to the one or more Payment terms.

2. The method of claim 1, wherein:
the user interaction includes visiting an online store.

3. The method of claim 1, wherein:
the user interaction includes selecting the item; and
the at least one offer applies to the selected item.

4. The method of claim 1, further comprising:
sending, by the processor, a notification describing the at least one offer to a user device associated with the user interaction; and
receiving, by the processor, a user request to apply the at least one offer,
wherein the processing is performed in response to the user request.

5. The method of claim 1, further comprising collecting, by the processor, a
plurality of offers from a plurality of sources, wherein the analyzing includes selecting
the at least one offer from the collected plurality of offers.

6. A server device comprising:
a transceiver;
a processor in communication with the at least one transceiver; and
a non-transitory memory in communication with the processor, the memory configured to store a plurality of offers and to store instructions that, when executed by the processor, cause the processor to perform processing including:
  detecting a user interaction with a user interface provided through a network by a server;
  analyzing the user interaction to identify, within the plurality of offers, at least one offer associated with an item available to be purchased from a vendor through the user interface, the at least one offer being provided by the vendor and associated with a user-selectable first payment type provided by the vendor, the identifying including determining that a benefit conveys to the user because of the application of the first payment type to a user transaction to purchase the item from the vendor according to terms of the offer;
  receiving a selection of the user-selectable first payment type and an acceptance of the at least one offer through the user interface;
  generating a virtual credit card number having applied thereto one or more payment terms specified by the first payment type;
  linking the virtual credit card number to a financial account of the user; and
  causing the user transaction to purchase the item from the vendor using the virtual credit card number to be processed according to the one or more payment terms, the causing including automatically applying, by a payment transaction service provided through the network, the first payment type to the transaction and charging or debiting the financial account of the user according to the one or more payment terms.

7. The device of claim 6, wherein the processing further includes:
sending, by the transceiver, a notification describing the at least one offer to a user device associated with the user interaction; and
receiving, by the transceiver, a user request to apply the at least one offer,
wherein the automatically applying is performed in response to the user request.

8. The device of claim 6, wherein the processing further includes collecting the plurality of offers from a plurality of sources and storing the collected plurality of offers in the memory.

9. The device of claim 6, wherein the collecting includes gathering data from at least one network source by the transceiver.

10. The device of claim 6, wherein the automatically applying includes selecting the first payment type from among a plurality of payment types associated with a user requesting the user transaction.

11. The device of claim 6, wherein the detecting includes analyzing network traffic received by the transceiver.

\* \* \* \* \*